United States Patent [19]

Kurk

[11] 3,800,128

[45] Mar. 26, 1974

[54] TRUE WIND SPEED COMPUTER

[75] Inventor: Thomas R. Kurk, Indianapolis, Ind.

[73] Assignee: The United States of America as represented by the Secretary of the Navy, Washington, D.C.

[22] Filed: Mar. 14, 1972

[21] Appl. No.: 341,000

[52] U.S. Cl............ 235/151.32, 235/150.2, 235/189
[51] Int. Cl............................ G06g 7/78, G06g 7/22
[58] Field of Search....... 235/150.2, 150.23, 150.26, 235/151.32, 186, 189; 73/189

[56] References Cited
UNITED STATES PATENTS

| | | | |
|---|---|---|---|
| 3,612,837 | 10/1971 | Brandau | 235/150.26 X |
| 3,532,267 | 10/1970 | Tobin, Jr. | 235/150.2 X |
| 3,185,980 | 5/1965 | Gustafson et al. | 73/189 X |
| 3,001,715 | 9/1961 | Beck | 235/186 |
| 3,657,726 | 4/1972 | Etherington | 235/150.2 |

Primary Examiner—Malcolm A. Morrison
Assistant Examiner—Jerry Smith
Attorney, Agent, or Firm—R. S. Sciascia; Paul S. Collignon

[57] ABSTRACT

An analog computer for calculating and displaying in digital form the speed and direction of true wind for a ship. Ship's speed and course and wind speed and direction are provided as inputs to a computer which calculates true wind speed by vectorially subtracting ship's velocity from wind speed. The subtraction is accomplished by electronic differential amplifiers which provide true wind speed in Cartesian coordinate form. These Cartesian coordinates are converted into polar coordinates which are then fed into an analog to digital converter so that a readout can be displayed in digital form.

3 Claims, 5 Drawing Figures

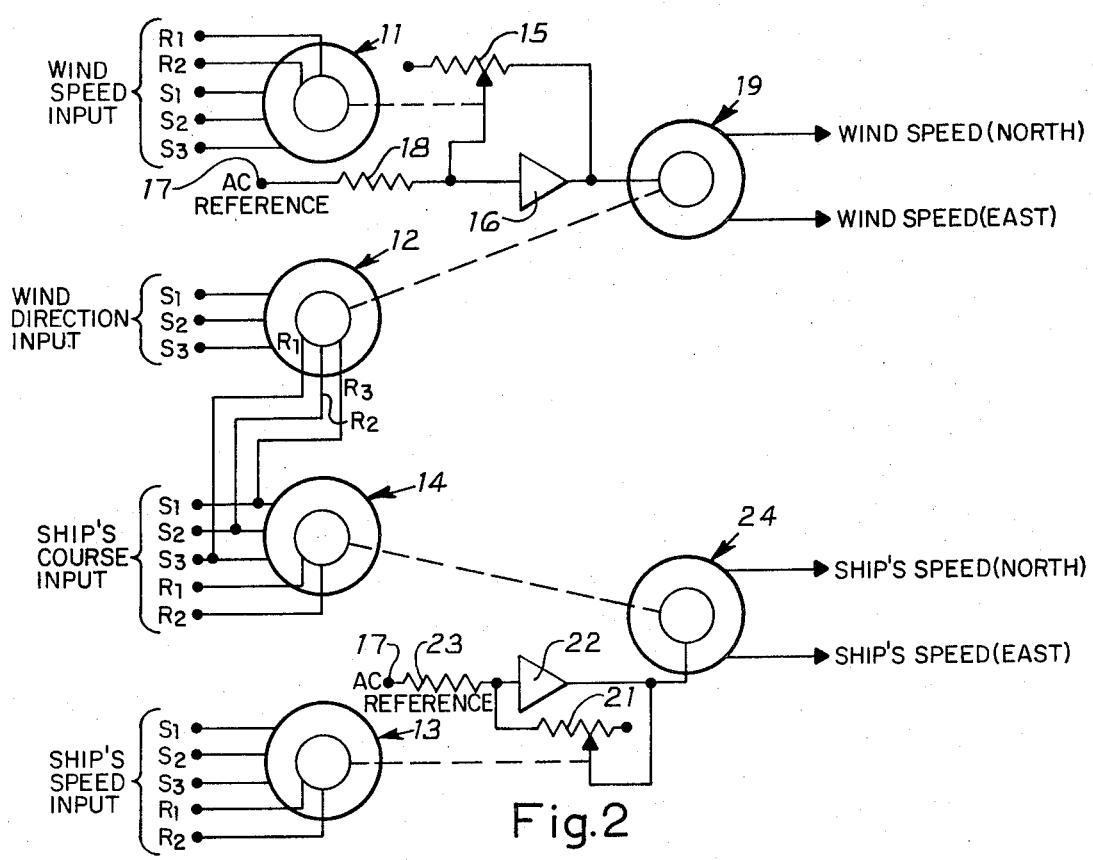
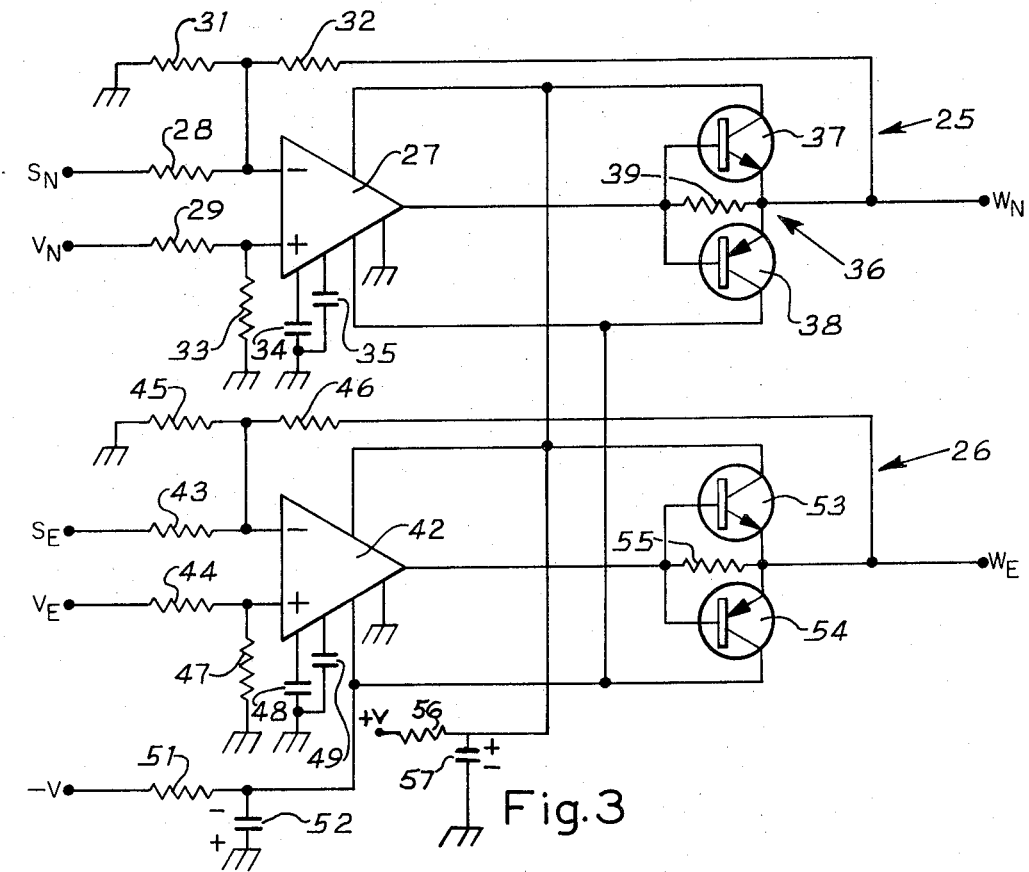

3,800,128

TRUE WIND SPEED COMPUTER

BACKGROUND OF THE INVENTION

The present invention relates to a true wind speed computer for a moving vehicle and more particularly to a true wind speed computer for a ship which can readily supply input signals for ship's speed and course from synchro outputs of the ship's log and gyro-compass or from an inertial navigation system. The magnitude and direction of wind is supplied from a wind sensor.

The output from a wind sensor aboard a moving ship is derived from the magnitude and direction of the wind and also from the speed and course of a ship. It is desirable to know the magnitude and direction of true wind and thus the ship's velocity must be vectorially subtracted from wind speed.

Various devices have heretofore been used to resolve true wind speed. One such device is shown and described in U.S. Pat. No. 3,657,726, entitled "Function Evaluating Apparatus," which issued Apr. 18, 1972, to Michael Etherington, and is adapted for evaluating the speed of a yacht to windward or downward. In this patented device, the speed of the yacht, yacht heading, apparent wind speed and apparent wind direction are used as inputs and an equation is solved to determined an unknown angle in a vector diagram. An oscillator is used to produce an alternating voltage of peak value and the unknown angle is determined when a detector determines an equality between two electrical signals each containing as a factor, the unknown angle.

SUMMARY OF THE INVENTION

The present invention relates to an analog computer that calculates and displays true wind speed component of the wind speed indicated on the ship's wind sensor. True wind speed is calculated by vectorially subtracting the ship's velocity from the velocity indicated by the wind sensor. Input signals for the ship's speed and course are derived from the synchro outputs of the ship's log and gyro-compass, or inertial navigation system.

Resolvers are used to perform a polar to Cartesian coordinate transformation on the wind and ship velocity vectors and the outputs of the resolvers give the vectors in orthogonal components which are referenced to the North and East. The Cartesian form vectors are directly subtracted in electronic differential amplifiers and the outputs from the subtracters are transformed back to polar form in a converter. The outputs from the converter are fed into an analog to digital converter so that wind speed and direction can be displayed in digital form.

BRIEF DESCRIPTION OF THE DRAWINGS

FIG. 2 is a schematic diagram of wind component and ship component resolvers;

FIG. 3 is a schematic diagram of differential amplifiers used for subtraction;

DESCRIPTION OF THE PREFERRED EMBODIMENT

Figure 1:
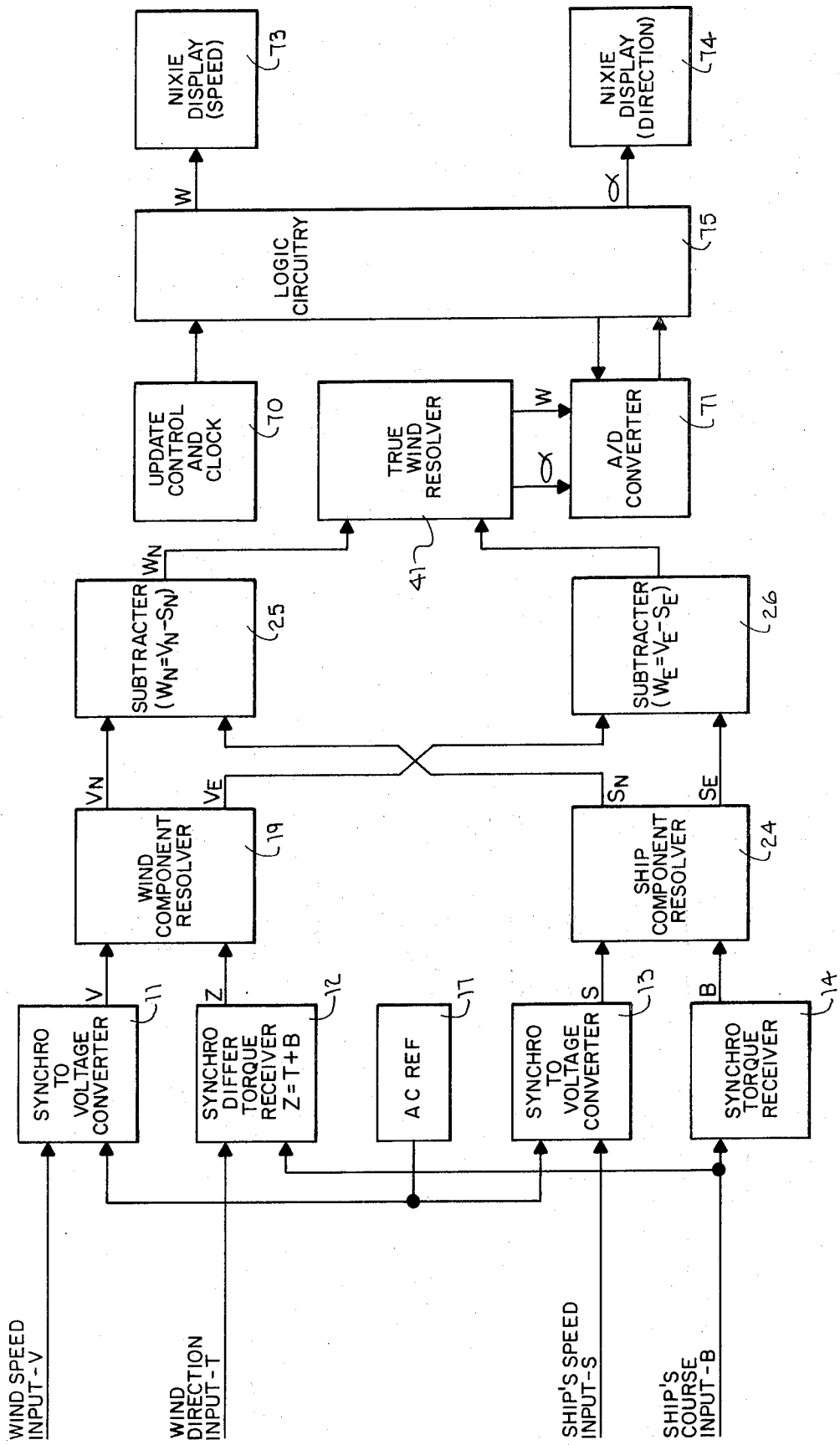
FIG. 1 is a block diagram illustrating a preferred embodiment of the present invention.

Referring now to the drawings, and particularly to FIGS. 1 and 2, synchro input signals to the true wind speed computer are connected to four synchro modules 11, 12, 13, and 14 which convert the synchro signals to signals which are used for computation. In FIG. 2 of the drawings, leads marked "S" indicate inputs to stator and leads marked "R" indicate inputs to rotor. The wind speed synchro module 11 converts the incoming wind speed signal to an AC signal having an amplitude proportional to speed. Conversion of the incoming signal is accomplished by connecting the shaft of potentiometer 15 to the shaft of synchro module 11. Thus the wiper of potentiometer 15 moves in synchronism with synchro 11. Amplifier 16 is an operational amplifier connected as an inverting amplifier with potentiometer 15 serving as a feedback resistor and the output voltage of amplifier 16 is proportional to the shaft position of potentiometer 15. Reference voltage 17 is connected to the input of amplifier 16 through resistor 18 and the output from amplifier 16 is connected to resolver 19.

Input synchro signals from a ship's log are converted to an AC analog voltage by synchro module 13, potentiometer 21 and amplifier 22. The conversion of a ship's speed signal to an AC voltage is similar to the above-described wind signal conversion. Resolver 24 receives an input from amplifier 22.

Wind direction synchro module 12 consists of a differential synchro having its output shaft connected by a 1 to 1 ratio gear train to resolver 19. A differential synchro 12 is used so that ship's heading can be added to the wind sensor's indicated wind direction. This is done in order to change the reference of the wind direction from the bow of the ship to North. The ship's course synchro module 14 has its shaft connected to the shaft of resolver 24, as shown in FIG. 2 of the drawings.

Referring now to FIGS. 1 and 3 of the drawings, subtracters 25 and 26 are provided for subtracting the North and East vector components which are outputs from resolvers 19 and 24. As best shown in FIG. 3 of the drawings, subtracter 25 consists of an operational amplifier 27 connected as a differential amplifier. Subtracter 25 computes the function $$W_N = V_N - kS_N. \quad (1)$$

The factor $k$ is present because the full scale input for ship's velocity is smaller than the wind sensor's full scale input. By way of example, the full scale input for ship's velocity might be 40 knots and the full scale input for the wind velocity might be 100 knots and "$k$" would then be 40/100 or 0.4. Resistor 31 is provided to allow the circuit to perform the desired computation and present equal impedance to both inputs of amplifier 27. An emitter follower 36 is provided in the output of subtracter 25 in order to provide sufficient current capability to drive resolver 41. Subtracter 26 is identical to subtracter 25 and computes the function $$W_E = V_E - kS_E. \quad (2)$$

Figure 4:
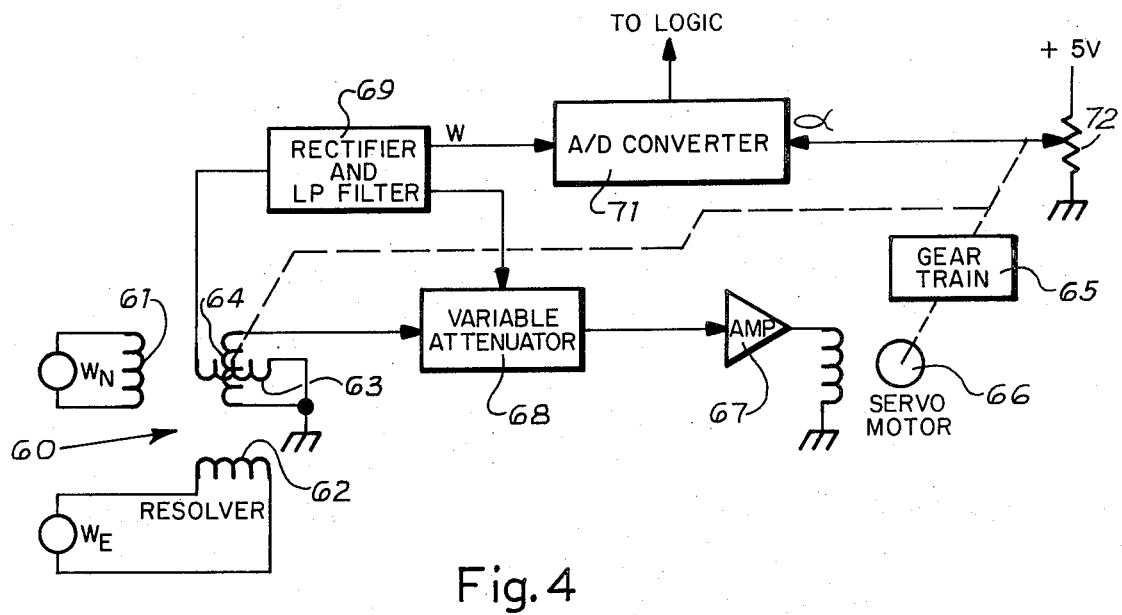
FIG. 4 is a block diagram of a true wind resolver component.

The true wind resolver 41 is shown in greater detail in FIG. 4 of the drawings. The Northern wind component signal and Eastern wind component signal from subtracters 25 and 26 are applied to the stator windings 61 and 62 of a resolver 60 and the rotor windings 63 and 64 are rotatable by a shaft which is connected through a gear train 65 to a servo motor 66. Servo motor 66 receives its power from amplifier 67 which has incorporated therewith a variable diode attenuator 68 that provides gain control. When servo motor 66 nulls resolver 60, the rotor of resolver 60 is positioned to provide an AC true wind speed signal, ($W$) which is rectified and filtered to provide a DC voltage which is the true wind speed input to analog to digital converter 71. When servo motor 66 nulls, its rotational position is representative of true wind direction ($\alpha$), and a potentiometer 72 is provided to give an input to A/D converter 71 which represents true wind direction. The rectifier and low pass filter 69 which are used to convert the true wind signal from AC to DC are necessary because analog to digital converter 71 only samples DC.

Figure 5:
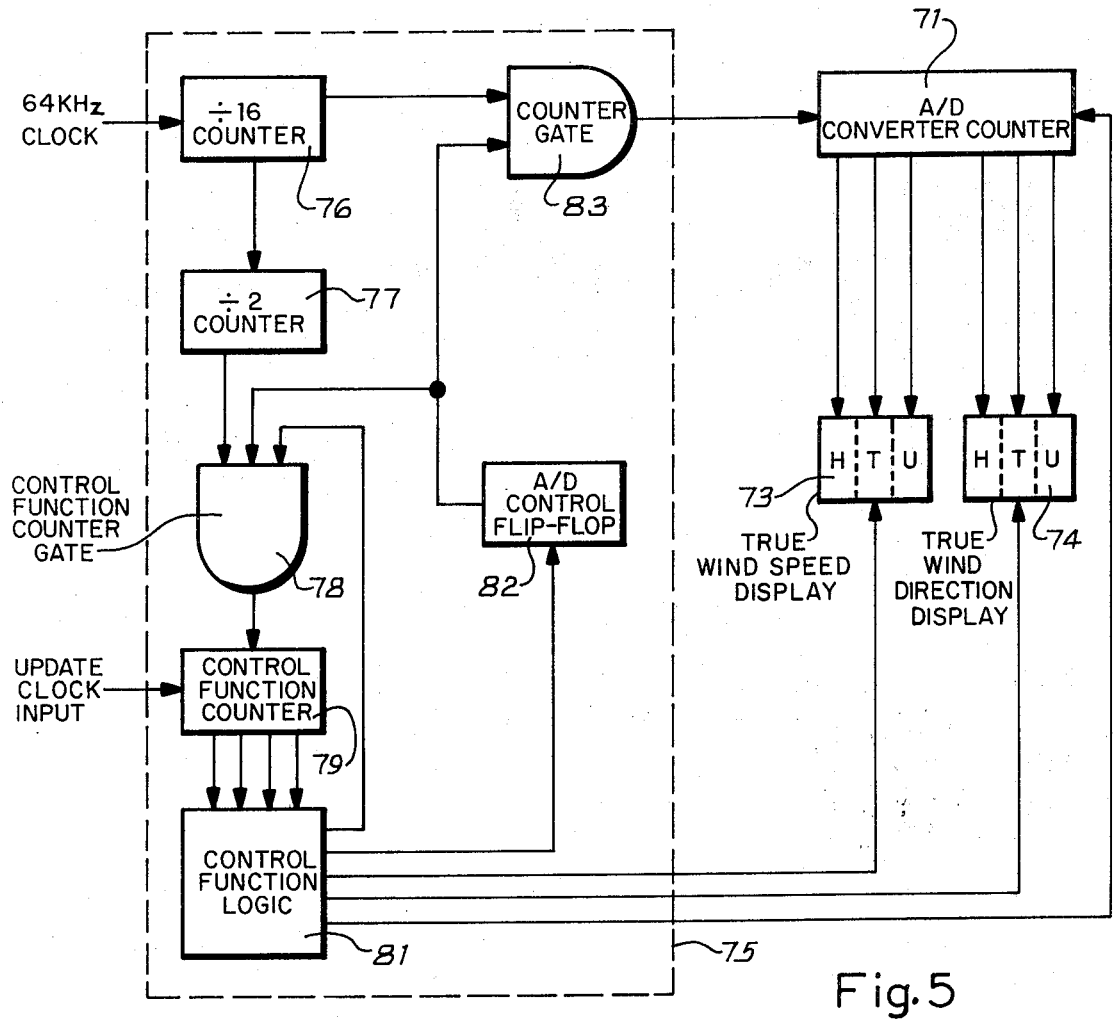
FIG. 5 is a block diagram of a logic component used in a preferred embodiment.

As shown in FIGS. 1 and 4 of the drawings, the true wind resolver 41 provides one output ($W$) which represents true wind speed and another output ($\alpha$) which represents direction of true wind. It is desirable that these voltages be converted to a visual display so that true wind speed and direction can be quickly ascertained. The readouts might be of various form such as by turning a shaft to rotate a dial, or by charting or graphing. One readout device used for a true wind speed computer which was built by the Naval Avionics Facility, Indianapolis, employed Nixie tubes which are manufactured by Burroughs Corporation, Plainfield, N.J. As shown in FIG. 5 of the drawing the true wind speed display 73 is comprised of three Nixie tubes for indicating hundreds, tens, and units and, likewise, the direction display 74 is comprised of three Nixie tubes. The output from analog to digital converter 71 is applied to displays 73 and 74 by means of logic circuitry 75.

The logic circuitry 75 is provided with two input signals, one being a 64 KHz clock frequency, which is divided by counter 76 to provide a frequency of 4 KHz, which is used to drive the A/D converter counter 71, and another output of counter 76 is divided by counter 77 to provide a frequency of 2 KHz for clocking the control function generator 79. An update clock input is employed so that the logic circuitry will periodically update displays 73 and 74 as the wind speed and direction change. By way of example, this update may occur every 2 seconds. The Nixie type gas discharge tubes can be driven by memory type decoders which convert information from converter 71 into the proper decimal digit. These memory type decoders are also manufactured by Burroughs Corporation and are compatible with the Nixie tubes. Since each decoder has a memory, it is only necessary to read-in the information to be stored and apply a strobe pulse. After the strobe pulse has subsided, the information may be removed without destroying the displayed data.

The resolvers, synchros and servo mechanisms which are shown in block diagram are well-known in the prior art. For example, a fuller explanation of these devices is given in the text, "Servomechanism Fundamentals" by Ben Zeines, published by McGraw-Hill Book Company, Inc. (1959). Likewise, the components of the logic circuitry are well-known in the prior art and these components are described in greater detail in the text, "Digital Computer Principles" by Burroughs Corporation, published by McGraw-Hill Book Company, Inc. (1962).

It can thus be seen that the present invention provides a novel apparatus for indicating true wind speed and direction aboard a moving vehicle.

It should be understood of course that the foregoing disclosure relates to only a preferred embodiment of this invention and that numerous modifications or alterations thereof may be made without departing from the spirit and the scope of the invention.

I claim:
1. A true wind speed computer comprising,
   first means for converting a wind speed signal into a first voltage signal having an amplitude proportional to wind speed,
   second means for combining a wind direction signal and a vehicle's course signal and providing a second voltage signal,
   third means for converting a vehicle's speed signal into a third voltage signal having an amplitude proportional to a vehicle's speed,
   fourth means for converting a vehicle's course signal into a fourth voltage signal,
   first resolver means connected to said first and second means for resolving said first and second voltage signals into one signal representative of a northern component of wind speed and another signal representative of an eastern component of wind speed,
   second resolver means connected to said third and fourth means for resolving said third and fourth voltage signals into one signal representative of a northern component of vehicle's speed and another signal representative of an eastern component of vehicle's speed,
   a first differential amplifier connected to said first and second resolver means for subtracting said signal representative of a northern component of vehicle's speed from said signal representative of a northern component of wind speed and providing a first difference signal,
   a second differential amplifier connected to said first and second resolver means for subtracting said signal representative of an eastern component of vehicle's speed from said signal representative of an eastern component of wind speed and providing a second difference signal,
   fifth means connected to said first and second differential amplifiers for resolving said first and second difference signals into a first output signal representative of direction of true wind and a second output signal representative of true wind speed, and
   means for digitally displaying said first and second outputs of said fifth means.
2. A true wind speed computer as set forth in claim 1 wherein said means for digitally displaying said first and second outputs of said fifth means includes first and second gaseous tube displays connected to said fifth means through logic circuitry and an analog to digital converter.
3. A true wind speed computer as set forth in claim 2 having signal means for timing said logic circuitry and updating said displays.

* * * * *